(No Model.)  3 Sheets—Sheet 1.

G. A. SCHEEFFER.
DIRECT CURRENT METER.

No. 599,302.  Patented Feb. 15, 1898.

Witnesses:
Inventor:
Gustave A. Scheeffer
By Barton & Brown
Attorneys.

(No Model.) 3 Sheets—Sheet 2.

G. A. SCHEEFFER.
DIRECT CURRENT METER.

No. 599,302. Patented Feb. 15, 1898.

Witnesses:

Inventor.
Gustave A. Scheeffer,
By Barton & Brown
Attorneys.

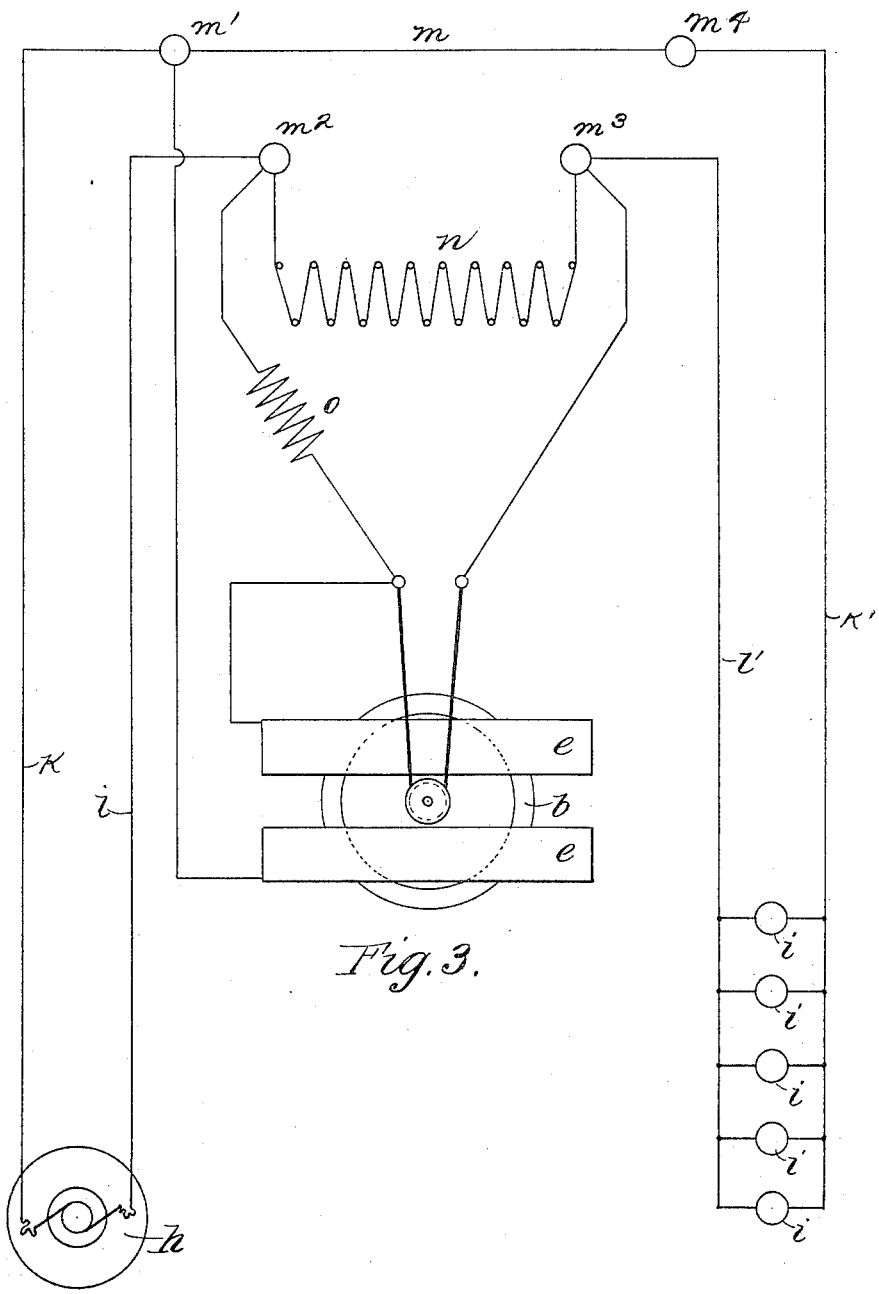

UNITED STATES PATENT OFFICE.

GUSTAVE A. SCHEEFFER, OF PEORIA, ILLINOIS, ASSIGNOR TO THE DIAMOND ELECTRIC COMPANY, OF SAME PLACE.

DIRECT-CURRENT METER.

SPECIFICATION forming part of Letters Patent No. 599,302, dated February 15, 1898.

Application filed May 7, 1896. Serial No. 590,563. (No model.) Patented in Canada December 2, 1896, No. 54,238.

*To all whom it may concern:*

Be it known that I, GUSTAVE A. SCHEEFFER, a citizen of the United States, residing at Peoria, in the county of Peoria and State of Illinois, have invented a certain new and useful Improvement in Direct-Current Meters, (Case No. 4,) of which the following is a full, clear, concise, and exact description, reference being had to the accompanying drawings, forming a part of this specification.

My invention relates to electric meters, the object thereof being to provide a meter insuring great accuracy in the measurement of even small currents flowing in the circuit to which the meter is connected and avoiding certain disadvantages to be met with in meters now commonly in use.

My said invention is shown and described in Canadian Letters Patent No. 54,238, granted upon my appplication therefor December 2, 1896.

The meter to which my improvements are applicable is a direct-current meter wherein a registering-train is driven by an armature mounted upon a shaft provided with a damping device, the features of my invention being enumerated as below: First, the armature and an adjusted resistance in multiple are connected in series with the fields which are in parallel with the circuit to be measured, so that sufficient current will at all times flow through the armature-coils to overcome the initial friction in the device, and the armature will, upon the slightest increase of current therethrough when translating devices are cut in, start the registering-train, the said armature and a light resistance in multiple being also connected in series with the working circuit; second, a cross-bar is provided for raising the armature-shaft from its lower jewel or bearing, and, third, the damping magnets are mounted so as to permit a lateral adjustment with regard to the disk rotating in their fields substantially in the plane of a diameter of said disk partially or entirely to include portions of said disk in their magnetic fields and thereby regulating their damping effect.

I will describe my invention more particularly by reference to the accompanying drawings, in which—

Figure 1:
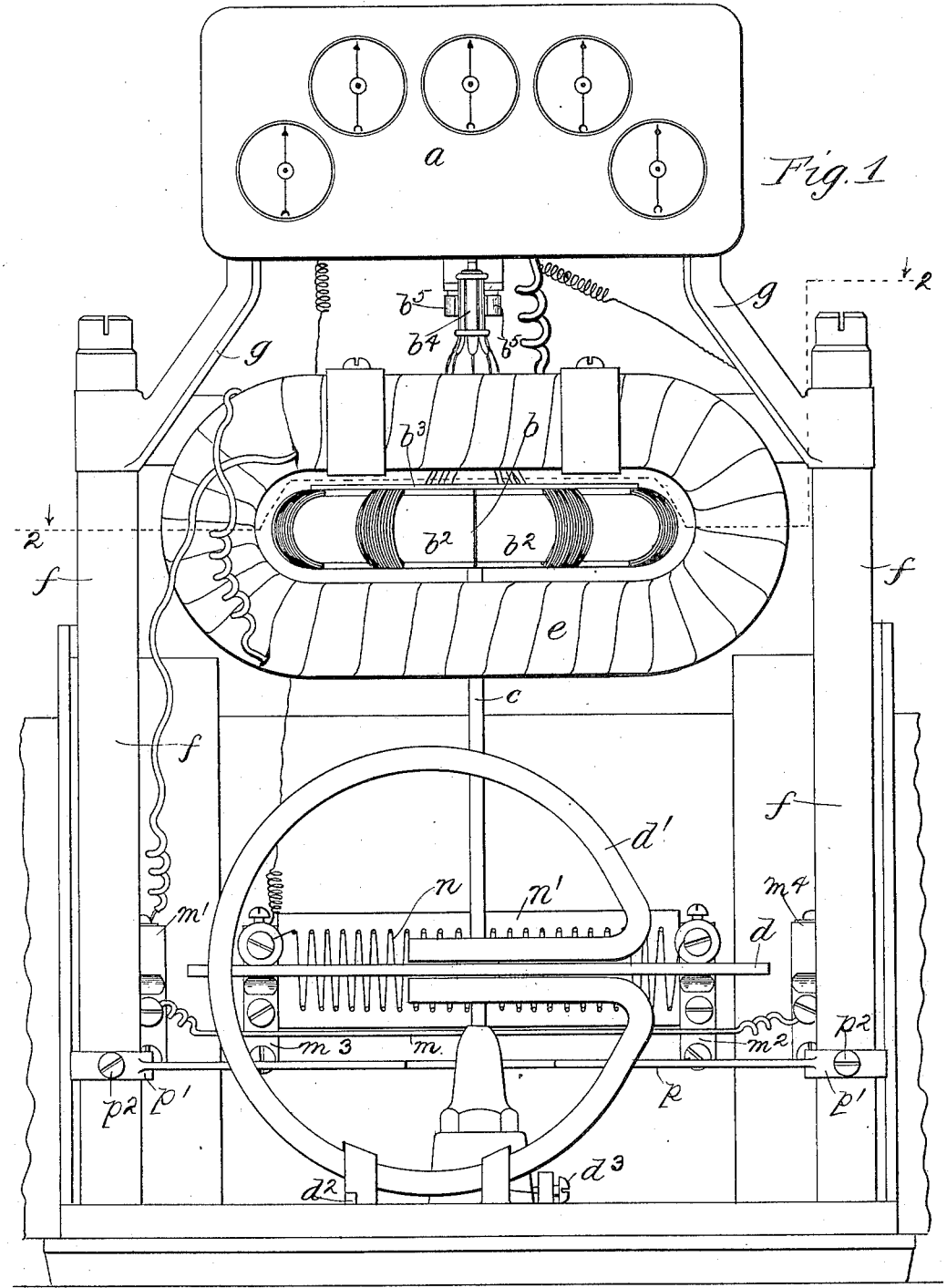
Figure 2:
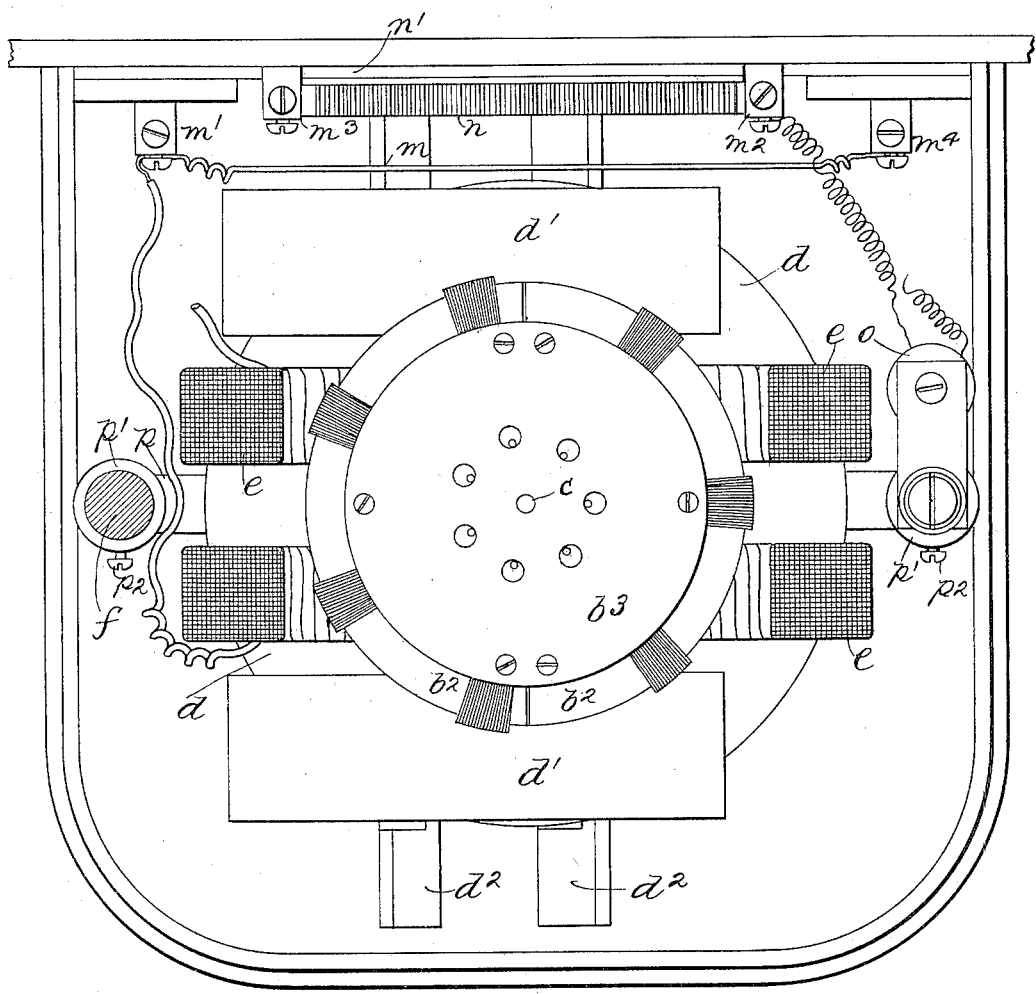

Figure 1 is a front elevation of a meter fitted with my improvements. Fig. 2 is a sectional view of the meter on line 2 2, Fig. 1. Fig. 3 is a diagrammatic view of the meter, showing the circuit connections.

Like parts are designated by the same letters of reference in the several figures.

The meter shown in elevation, Fig. 1, is provided with a registering-train $a$, which is driven by the meter-armature $b$, mounted upon the vertical shaft $c$, rotating in end bearings designed to reduce friction to the minimum. Near the lower end of the said shaft is secured the disk $d$, which rotates between the poles of the damping-magnets $d'$. Field-coils $e$, within which the armature rotates, are supported by the uprights $f$ and frame $g$.

The generator or source of current $h$ is connected in circuit with the translating devices $i$ by the limbs $k$ $k'$ and $l$ $l'$. Binding-post $m'$ of the meter is connected with the limb $k$ of the circuit and binding-post $m^4$ with limb $k'$, the wire $m$, of large cross-section, serving to connect the binding-posts $m'$ $m^4$. Similarly binding-post $m^2$ of the meter is connected with the limb $l$ of the circuit and binding-post $m^3$ with the limb $l'$. A light resistance $n$ is cut in between the binding-posts $m^2$ and $m^3$. The field-coils $e$ of the meter, which are in series, are connected between the limbs $k$ and $l$ in parallel with the translating devices. The armature $b$ is connected in multiple with the resistance $n$ between the binding-posts $m^2$ $m^3$, which are connected in series with the working circuit. The said armature is of the Gramme-ring type, the core of which for convenience in winding is constructed in sections $b^2$ of some light non-magnetic material, as wood, whereby the weight is reduced.

Upon the sectional core are wound seven coils of fine wire, which are connected with the commutator-segments $b^4$. Secured to the shaft $c$, which drives the registering-train $a$, is an aluminium disk $b^3$, to which the sections of the core $b^2$ are fastened in position by screws. Great difficulty has been experienced in the past by variation in the resistance at the commutator of electric meters, which necessarily renders them inaccurate. The materials usually employed for brushes and commutator-segments soon become oxidized or coated by reason of the sparking at this point, and numerous attempts have been made to obviate this difficulty. I provide in my improved meter commutator-segments $b^4$, of German-silver alloy, and the brushes $b^5$ preferably have bearing-faces of platinum, which I have found uniformly furnish clean bright contact-surfaces even after continued use, and in consequence the resistance at this point is not subject to variation.

At $o$ is provided a resistance which is adjusted to permit sufficient current to flow from the field-coils through the armature to counterbalance the retarding influence of the slight amount of friction necessarily present in the device—that is, the resistance is such that the armature will at all times be supplied with current which in value is just short of that necessary to start the armature and registering-train in motion. It will be seen that in consequence of this the slightest increase in current flowing through the armature, which would be occasioned by cutting into circuit any of the translating devices, will at once set the armature and the registering-train in motion. By this arrangement of circuits the inaccuracy caused by friction is obviated. Consequently a very small consumption of current in the circuit is as accurately registered by the meter as is the maximum.

The resistance $n$, introduced into the circuit between the binding-posts $m^2 m^3$, is only a fractional part of an ohm, for which I preferably employ a bare ribbon of German-silver alloy. A block $n'$, of insulating material, has pins inserted at short intervals near either edge, upon which the said ribbon is mounted, passing around the pins from one side to the other, so as to leave the entire length of ribbon fully exposed to the air, whereby the slight amount of heat generated therein by the passage of the current may be rapidly radiated.

When the meter is not in use, and especially during the time it is liable to be jarred, as when it is moved from place to place or is being fastened in position, it is desirable that the movable parts be held stationary and the armature-shaft be raised from its lower bearing. For this purpose the bar $p$ is provided, having collars $p'$ fitting upon the uprights $f$, and is adapted to be raised until it supports the disk $d$ and lifts the armature-shaft $c$ from its lower bearing or jewel, in which position the said bar is adapted to be secured by the screws $p^2$, provided in the collars.

Upon the base-plate of the meter guides or ways $d^2$ are provided, in which the damping-magnets $d'$ are inserted, wherein they have a lateral adjustment, so that more or less of the said disk may be included in their magnetic fields as the magnets are laterally moved in their guides toward or away from the shaft $c$. This adjustment permits the damping effect of the magnets to be regulated, and screws $d^3$ are provided in the said ways to secure the magnets in the position desired. As long as none of the translating devices are cut into circuit the meter will of course remain inoperative, as the slight amount of current supplied to the armature through the fields, which are connected across the mains and receive a small but practically constant current, serves merely to furnish a torque that is just under that required to rotate the armature; but immediately there is any consumption of current between the branches $k' l'$ the resistance $n$ will divert a definite proportion thereof to the circuit through the armature-coils, and the resulting increase of torque will set the armature and registering-train in motion, no matter how slight the increase may be, as the initial friction of the device is overcome by the constant torque caused by the shunted current from the fields. As the increase of torque will always be proportional to the current flowing through the translating devices $i$, the armature is adapted to correctly register the current consumption.

By reason of the circuit connections for overcoming the initial friction, material reduction in the weight of the rotating parts, and a light resistance that is in parallel with the circuit through the armature the improved meter above described is made very sensitive to the flow of current in the working circuit and will register the same where meters of the ordinary type will remain entirely inoperative.

Having thus described my invention, what I claim as new, and desire to secure by Letters Patent, is—

1. In an electric meter, the combination with field-coils connected with the circuit to be measured, of an armature adapted to be actuated thereby which is connected with said circuit and with the field-coils to receive current passing through said coils sufficient to supply a torque thereto adapted to overcome the initial friction of the rotating parts, substantially as described.

2. In a direct-current electric meter, the combination with an armature and an adjusted resistance of field-coils connected in a branch across the mains of the measured circuit in series with said armature and resistance as multiple branches, and a second resistance cut into one of the mains of the said measured circuit between the points at which the armature and adjusted resistance are connected, substantially as described.

3. The combination in an electric meter with the field-coils $e$ connected in a branch across the mains of the circuit to receive measurement of the armature $b$ and resistance $o$ connected as multiple branches in series with the field-coils, said resistance being adjusted to divert to the armature a sufficient amount of the current flowing through the fields to supply a torque adapted to overcome the initial friction of the meter parts, and a light resistance $n$ cut into one of the mains of the measured circuit between the points at which the armature and the adjusted resistance are connected, substantially as described.

4. In an electric meter, the combination with a vertical shaft whereon the rotating parts are mounted, of a laterally-extending bar or strip adapted to be adjustably secured at such a height as to support the weight of the shaft and mountings, substantially as described.

5. In an electric meter, the combination with the shaft $c$ whereon the armature $b$ and disk $d$ are mounted, of the bar $p$ provided with collars $p'$ encircling the uprights $f$, the said bar being adapted to be raised and lift the said shaft from its lower bearing or jewel and be secured in position by the screws $p^2$ provided in the said collars, substantially as described.

6. In an electric meter, the combination with a disk mounted upon a driving-shaft of the registering-train, of permanent damping-magnets between the poles of which said disk rotates, and guides or ways extending in planes parallel to a diameter of the disk wherein the said magnets are laterally adjustable in the plane of rotation of the said disk and adapted thereby to include portions of the disk partially or entirely in the fields of the damping-magnets, substantially as described.

7. In a damping device of an electric meter, the combination with an aluminium disk mounted upon and rotating with the driving-shaft of the registering-train, of permanent magnets between the poles of which the said disk is adapted to rotate, and ways or guides extending in planes parallel to a diameter of the disk wherein the said magnets are mounted, permitting a lateral adjustment of the magnets to include more or less of the disk in their magnetic fields and vary the damping effect of the device, substantially as described.

8. In an electric meter, the combination with the aluminium disk $d$ mounted upon the vertical shaft $c$, of permanent damping-magnets $d'$, between the poles of which the said disk is adapted to rotate, ways or guides $d^2$ extending in planes parallel to a diameter of the disk wherein the said magnets are laterally adjustable in the plane of rotation of the said disk and adapted thereby to include portions of the disk partially or entirely in their magnetic fields to secure the regulation of the damping effect of the device, and means for securing the said magnets in their adjusted positions, substantially as described.

In witness whereof I hereunto subscribe my name this 28th day of April, A. D. 1896.

GUSTAVE A. SCHEEFFER.

Witnesses:
W. T. ABBOTT,
L. F. GIBSON.